United States Patent
Girtman et al.

(10) Patent No.: US 9,982,691 B2
(45) Date of Patent: May 29, 2018

(54) DOUBLE ACTING FLUIDIC CYLINDER FOR MATERIAL HANDLING

(71) Applicant: Intelligrated Headquarters, LLC, Mason, OH (US)

(72) Inventors: Michael Girtman, O'Fallon, MO (US); Kenneth S. Wales, Mason, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 342 days.

(21) Appl. No.: 14/698,711

(22) Filed: Apr. 28, 2015

(65) Prior Publication Data
US 2015/0308466 A1 Oct. 29, 2015

Related U.S. Application Data

(60) Provisional application No. 61/985,417, filed on Apr. 28, 2014.

(51) Int. Cl.
*F15B 15/14* (2006.01)
*B25J 9/14* (2006.01)
(Continued)

(52) U.S. Cl.
CPC .......... *F15B 15/1457* (2013.01); *B25J 9/144* (2013.01); *B25J 15/0052* (2013.01);
(Continued)

(58) Field of Classification Search
CPC ...... B25J 9/144; B25J 14/052; B25J 15/0616; F15B 16/1457
See application file for complete search history.

(56) References Cited

U.S. PATENT DOCUMENTS 3,912,317 A * 10/1975 Ohnaka .................... B25J 9/144
294/186
5,605,432 A * 2/1997 Fink ........................ B25J 15/04
414/752.1
(Continued)

FOREIGN PATENT DOCUMENTS

DE 427438 A1 8/1993
JP H0483590 U 7/1992

OTHER PUBLICATIONS

International Search Report and Written Opinion of International Searching Authority for International Patent Application No. PCT/US2015/028077 dated Oct. 12, 2015, 17 pages.

*Primary Examiner* — F. Daniel Lopez
*Assistant Examiner* — Daniel Collins
(74) *Attorney, Agent, or Firm* — Alston & Bird LLP

(57) ABSTRACT

An apparatus and a method of using a plurality of dual acting cylinders to acquire articles with vacuum cups is disclosed. A robot arm comprises a manipulator movable with the robot arm with the plurality of dual acting cylinders attached to the manipulator. The robot arm is configured to passively conform to a plurality of irregular articles by extending dual acting cylinders from manipulator and moving the manipulator distally with the robot arm to conform to the plurality of irregular articles. The movement causes each dual acting cylinder to passively and proximally retract from the contact of the vacuum cup with a respective irregular article and passively conform the vacuum cups and dual acting cylinders to the plurality of irregular articles. Each vacuum cup can adhere to and can manipulate acquired articles with vacuum.

38 Claims, 12 Drawing Sheets

(51) Int. Cl.
*B25J 15/06* (2006.01)
*B65G 47/91* (2006.01)
*B25J 15/00* (2006.01)
*B65G 67/24* (2006.01)

(52) U.S. Cl.
CPC ........ *B25J 15/0616* (2013.01); *B65G 47/912* (2013.01); *F15B 15/149* (2013.01); *F15B 15/1466* (2013.01); *B65G 67/24* (2013.01); *F15B 2211/8855* (2013.01); *F15B 2211/89* (2013.01)

(56) References Cited

U.S. PATENT DOCUMENTS

| | | | |
|---|---|---|---|
| 8,473,094 B2 * | 6/2013 | Becker | B65G 47/914 294/65 |
| 2012/0076629 A1 * | 3/2012 | Goff | B25J 9/1612 414/730 |

* cited by examiner

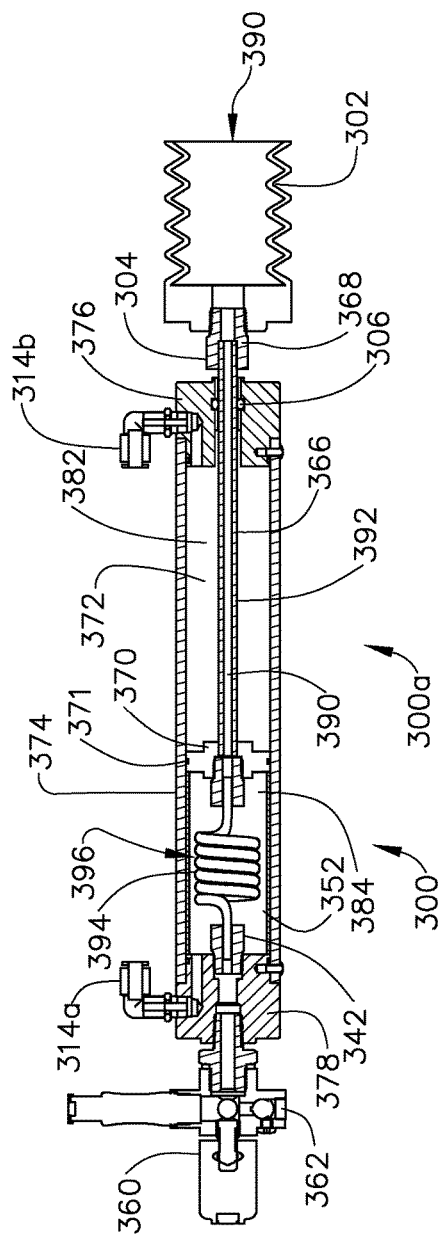
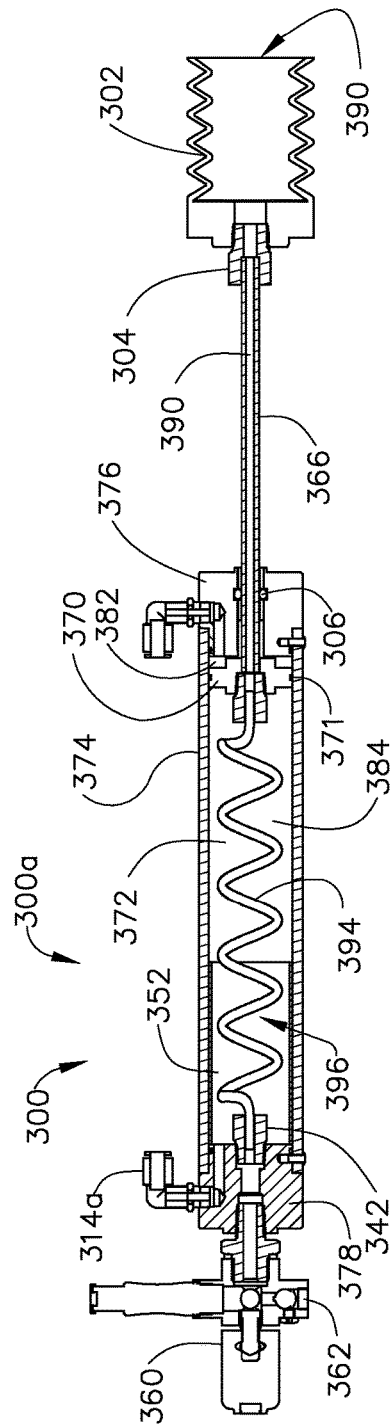

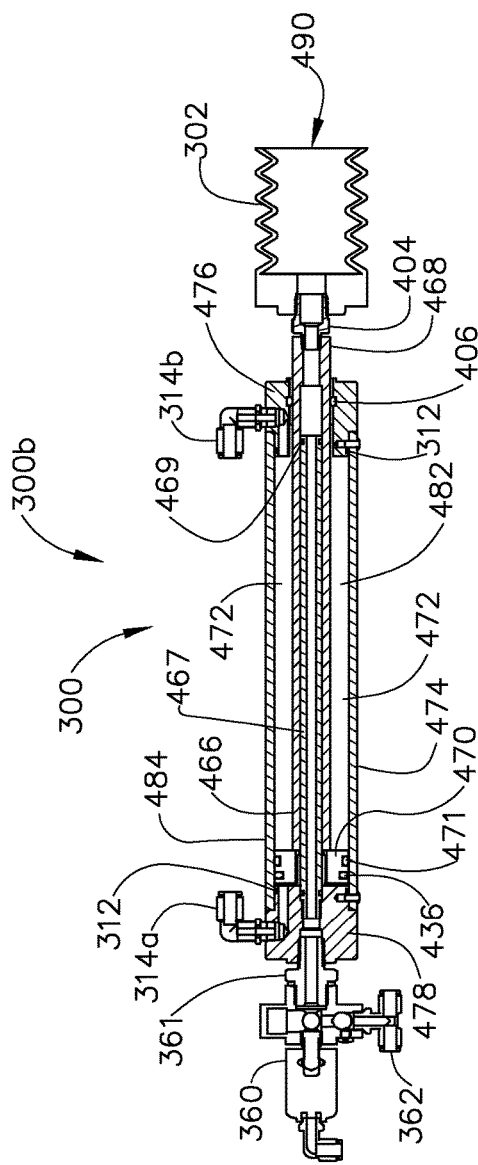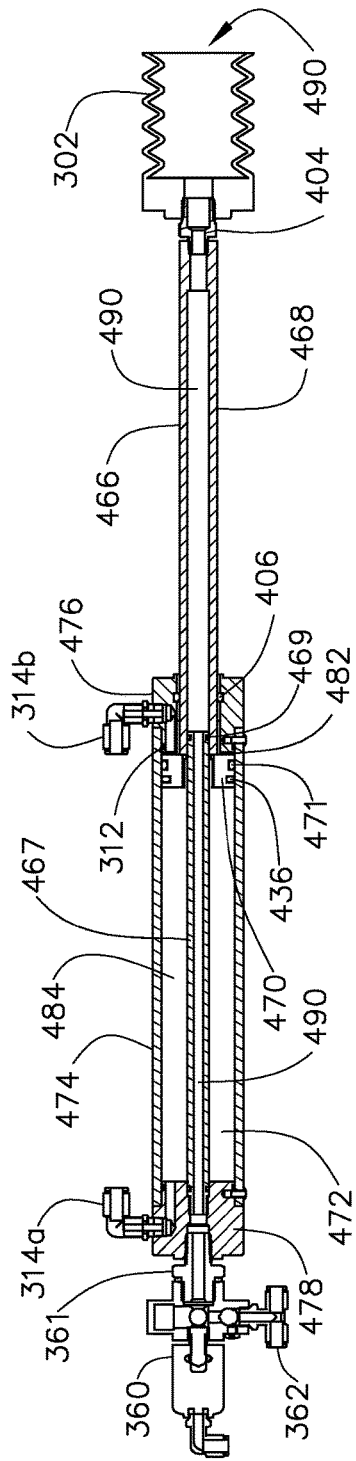

DOUBLE ACTING FLUIDIC CYLINDER FOR MATERIAL HANDLING

RELATED APPLICATIONS

The present application claims the benefit of priority to U.S. Provisional Application No. 61/985,417, entitled "DOUBLE ACTING FLUIDIC CYLINDER FOR MATERIAL HANDLING" filed Apr. 28, 2014, the entire contents of which are hereby incorporated by reference in its entirety.

TECHNICAL FIELD

The present disclosure relates generally to a double acting cylinder powered by a fluid, and more particularly directed to a double acting cylinder with a hollow moving shaft.

BACKGROUND

Double acting actuators have been used for years to provide two opposing directions of powered actuation from a single actuator. Double actuating actuators can be actuated by a fluid that is compressible or incompressible such as air or hydraulic fluid respectively. There are many uses for dual acting cylinders in the material handling world. For example, dual acting cylinders might be used to actuate diverts to divert moving articles from one conveying surface to another, block articles on a conveying surface, or might be used to move articles from one location to another during the loading, unloading, and storage of articles.

The world of material handling can involve the acquisition and movement of articles that range from small and light to large and heavy. As a consequence, material handling equipment must be rugged, durable, and fragile areas must protect from unintended bumps and collisions. In some cases, the material handling equipment must be small enough to fit into tight spaces. Some dual acting cylinders can have a hollow rod that extends out the front and the back ends of the cylinder and reciprocates longitudinally relative to the cylinder. This arrangement prevents communication of the hollow of the hollow shaft with the insides of the cylinder, but adds additional length to the dual acting cylinder. Flexible tubing can be attached to the back end of the hollow rod to communicate air or vacuum to the front end of the hollow rod as it reciprocates, but this adds even more length to the dual acting cylinder and exposes two ends of the hollow rod and the flexible tubing to potential damage. What is needed is a dual acting cylinder that is short in length, and protected from unintended bumps and collisions.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

In one aspect of the subject innovation, a dual acting fluidic cylinder is disclosed comprising a hollow cylinder having a front end and a rear end enclosing a chamber within. A rod and piston are reciprocatingly movable within the chamber with a tip of the rod protruding through the front end of the cylinder. A passageway extends through the dual acting cylinder from the rear end to the protruding tip of the rod. The passageway provides open communication between the tip and the rear end, and changes length along the direction of reciprocation as the rod and piston move.

In a second aspect of the innovation, a dual acting fluidic cylinder comprises a hollow cylinder having a front end and a rear end enclosing a chamber within. A rod and piston are reciprocatingly movable within the chamber of the hollow cylinder with a tip of the rod protruding through the front end of the cylinder. The rod and cylinder have a rigid passageway extending through the rod and the piston. An open flexible passageway connects between the rear end and the rigid passageway in the piston. The flexible portion changes length when the rod and piston moves in a reciprocating direction.

In a third aspect of the subject innovation, a method of controlling a robot arm with a controller is disclosed. The robot arm is configured to passively conform to a plurality of irregular articles. The robot arm comprises a manipulator movable with the robot arm and with a plurality of dual acting cylinders attached to the manipulator. Each of the dual acting cylinders has a front chamber and a rear chamber and each has a vacuum cup movable as the dual acting cylinder extends and retracts. Each of the vacuum cups is connected to a passageway extending through the dual acting cylinder with each passageway changing length as the dual acting cylinder extends and retracts. A vacuum source is switchably connected to the vacuum cups through the passageway. A compressed air source is switchably connected to each of the front and rear chambers to respectively retract and extend the vacuum cups. The method comprises the steps of: First extending the dual acting cylinders from the manipulator by pressurizing the rear chamber. Next, preparing the dual acting cylinders to be proximally, passively moved by opening front and rear cylinders to atmosphere. Then actuating each vacuum source of each dual acting cylinder to provide suction to a respective vacuum cup. And then, moving the manipulator distally with the robot arm to conform to the plurality of irregular articles. The movement causing each dual acting cylinder to passively and proximally retract from contact of the vacuum cup with a respective irregular article and to passively conform the vacuum cups and dual acting cylinders into contact with the plurality of irregular articles.

Although an embodiment described herein in comprises a robotic vehicle, it will be understood that the present innovation is not limited in use or application thereto.

BRIEF DESCRIPTION OF THE FIGURES

The accompanying drawing, which are incorporated in and constitute a part of this specification, illustrate exemplary embodiments of the inventive subject matter, and, together with the general description of the inventive subject matter given above, and the detailed description of the embodiments given below, serve to explain the principles of exemplary embodiments of the present inventive subject matter.

FIG. 5 illustrates a retracted cross sectional view of the first embodiment of the dual acting cylinder of FIG. 4 wherein the vacuum passage extending longitudinally therethrough passes through an extendable and retractable coil hose portion thereof.

FIG. 6 illustrates an extended cross sectional view of the first embodiment of the dual acting cylinder of FIG. 5 showing the coil hose portion internally extended.

FIG. 7 illustrates a retracted cross sectional view of a second embodiment of a dual acting cylinder shown in FIG. 3 wherein the vacuum passage extending longitudinally therethrough passes through an extendable and retractable nested tubing portion thereof.

FIG. 8 illustrates an extended cross sectional view of the second embodiment of the dual acting cylinder showing the nested tubing portion extended.

DETAILED DESCRIPTION

Figure 1:
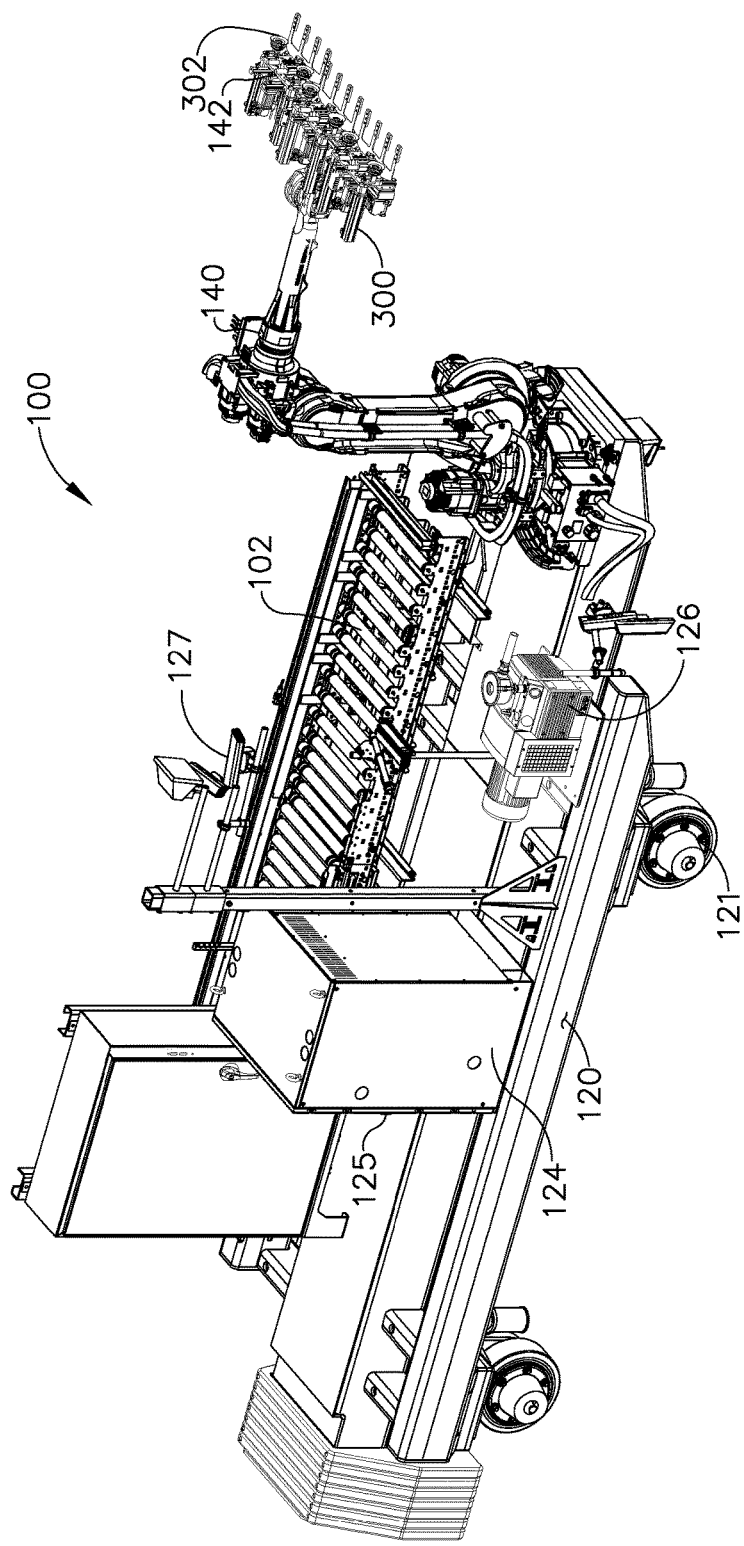
FIG. 1 illustrates an isometric view of a first autonomous robotic vehicle for loading and unloading articles.
Figure 2:
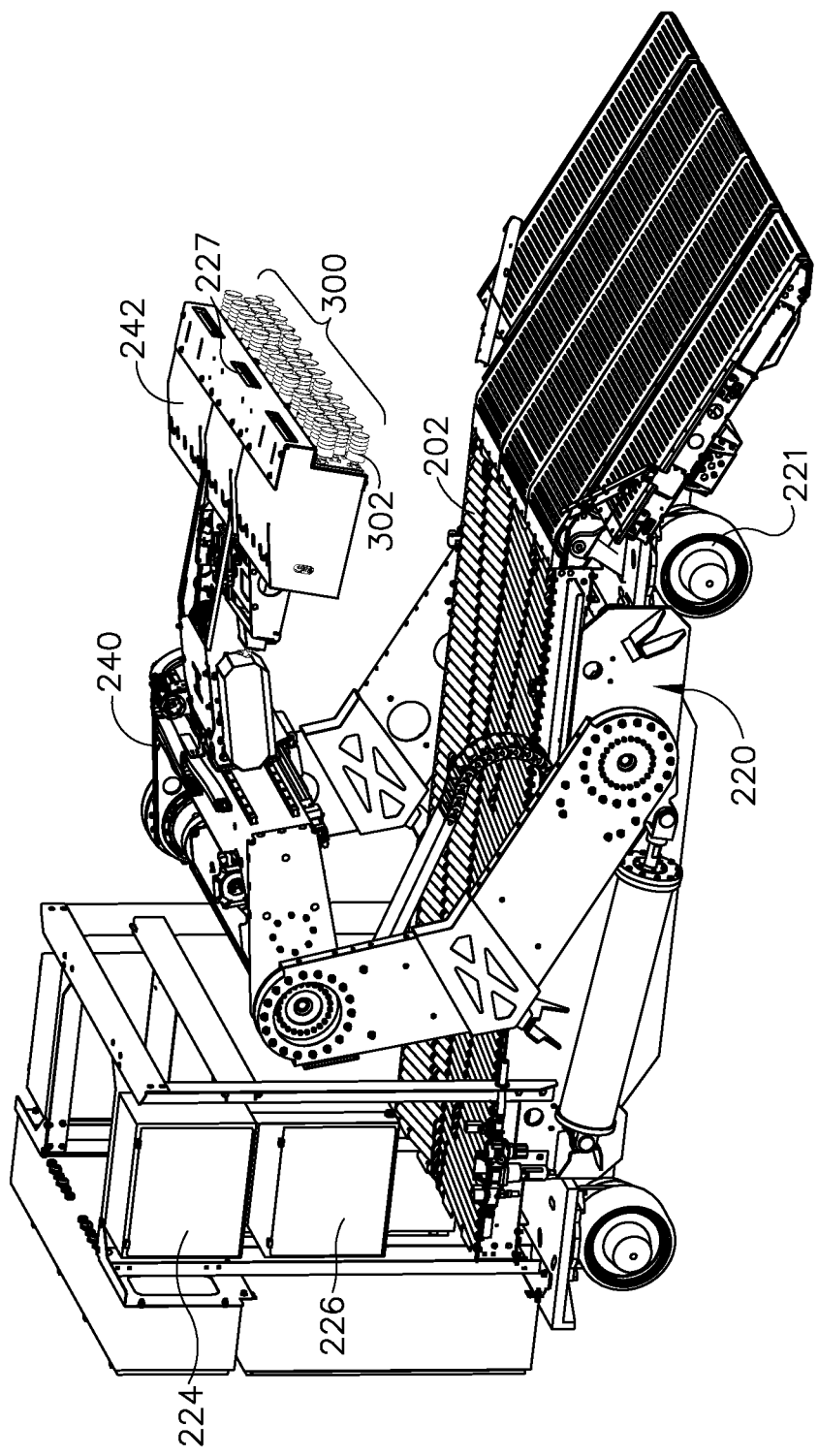
FIG. 2 illustrates an isometric view of a second autonomous robotic vehicle for unloading articles.

FIGS. 1 and 2 depict a first robotic vehicle 100 and a second robotic vehicle 200 respectively. First robotic vehicle 100 is configured to load and unload articles 50, and second robotic vehicle 200 is configured to unload bulk quantities of articles 50 rapidly. Both first and second robotic vehicles 100, 200 can operate autonomously, and can be sized to operate in truck trailers or shipping containers (not shown) or in a warehouse environment. As will be described below, each of the first autonomous robotic vehicle 100 and the second robotic vehicle 200 include dual acting cylinders 300 of the present innovation to acquire and release articles 50 therewith.

As shown in FIG. 1, first robotic vehicle 100 can comprise a mobile body 120 having a conveying surface 102, a controller 124, a compressed air source 126, at least one visualizer 127, and a robot arm 140 attached thereto. A manipulator 142 attaches to a free end of the robotic arm 140 and comprises a plurality of dual acting cylinders 300 each having extendable vacuum cup 302, also referred to herein as suction cup, for the pick up or and place down of articles 50 during loading or unloading. Controller 124 can use visualizer 127 to autonomously move first robotic vehicle 100 into a trailer or container (not shown) on wheels 121. Once in position, controller 124 can autonomously control unloading and loading of articles 50 by coordinating movement of the robotic arm 140, the manipulator 142, the dual action cylinders 300, and applying vacuum to vacuum cups 302. This process will be described later. Articles 50 can comprise cartons, packaged goods, bags, shrink wrapped trays, and the like. Conveying surface 102 can convey articles 50 to the robotic arm 140 during loading, and can carry articles 50 away during unloading.

In FIG. 2, a second robotic vehicle 200 for bulk unloading of general merchandising articles 50 within a truck or truck trailer is depicted. Second robotic vehicle 200 can comprise a mobile body 220 having an unscrambling conveying surface 202, a controller 224, a compressed air source 226, at least one visualizer 227, and a robotic arm 240 attached thereto. A manipulator 242 attaches to the movable end of the robotic arm 240 and comprises a plurality of dual acting cylinders 300 with extendable and retractable vacuum cups 302 thereon. Cylinders 300 and vacuum cups 302 can be extended and retracted to acquire articles with vacuum, and can place and release the articles 50 onto the unscrambling conveying surface 202. Controller 224 can autonomously move robotic vehicle 200 into a trailer or container (not shown) on wheels 221, and after scanning the articles to be unloaded with visualizer 227, can autonomously unload articles 50 with the robotic arm 240 and the manipulator 242. Robot arm 240 reaches out to acquire multiple articles 50 with manipulator 242, and pulls back to place acquired articles 50 onto conveying surface 202. Conveying surface 202 conveys the placed articles 50 through the robot arm 240 and out of a rear of the second robotic vehicle 200. Compressed air source 226 can be on the second robotic vehicle 200 or can be supplied from the warehouse environment. Controller 224 controls all movements and actions of second robotic vehicle 200.

Figure 3:
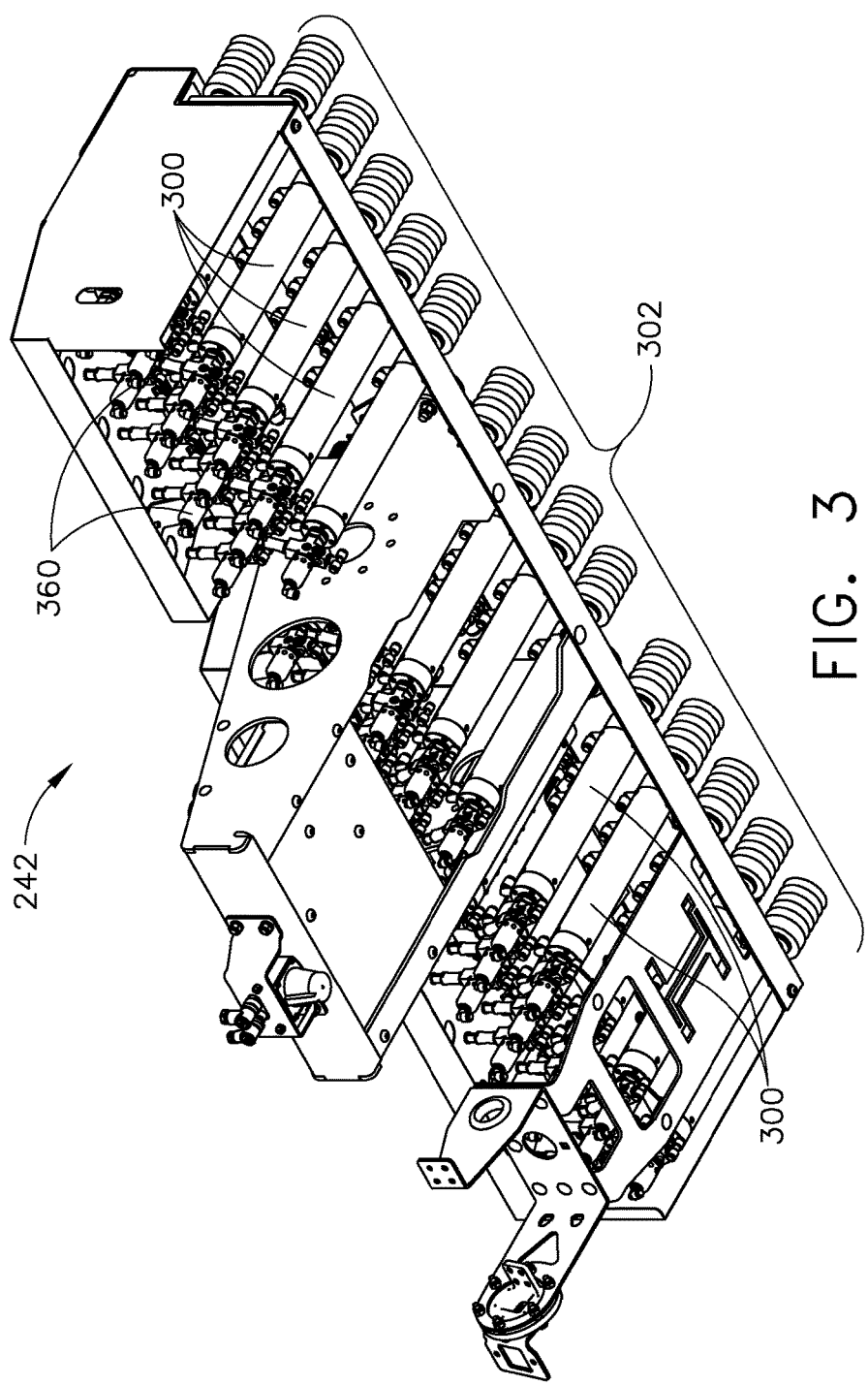
FIG. 3 illustrates an underside view showing a plurality of dual acting cylinders attached to a manipulator at an end of a robotic arm of the second autonomous robotic vehicle shown in FIG. 2, each of the plurality of dual acting cylinders is extendable and retractable, and each has an extendable and retractable vacuum passage extending therethrough with a vacuum cup at one end of the vacuum passageway.

FIG. 3 shows an enlarged view of manipulator 242 comprising the plurality of dual acting cylinders 300, each with a vacuum cup 302 defining an extendable and retractable end thereof. Vacuum cups 302 can be extended away from the manipulator 142 to pick up or acquire articles 50, and retracted back to pull articles 50 back to the manipulator 242. Vacuum cups 302 can be made of an elastomer and can partially deflect when contacting articles 50 to ensure a vacuum seal therebetween. Dual acting cylinders 300 can be extended or retracted with compressed air from compressed air source 226, and vacuum cups 302 can each be controllably connected to one or more suction or vacuum sources 360. As shown, vacuum sources 360 can be individual vacuum generators attached to a rear portion of each dual acting cylinder 300. Each vacuum cup 302 can communicate with the vacuum source 360 through dual acting cylinders 300 to adhere to and can manipulate acquired articles 50 with vacuum. Controller 224 controls all movements and actions of second robotic vehicle 200.

The innovation disclosed and claimed herein, in one aspect thereof, is an extendable and retractable dual action cylinder 300 with a changeable length vacuum passageway 390 extending therethrough that changes length as the dual action cylinder 300 extends and retracts. Each dual acting cylinder 300 can include a vacuum cup 302 and a vacuum source 360 communicating through the changeable length vacuum passageway 390. Dual acting cylinder 300 can be used with either of first robotic vehicle 100 or second robotic vehicle 200, or with other fixed site material handling equipment such as, but not limited to palletizers with movable robot arms and manipulators.

Figure 4:
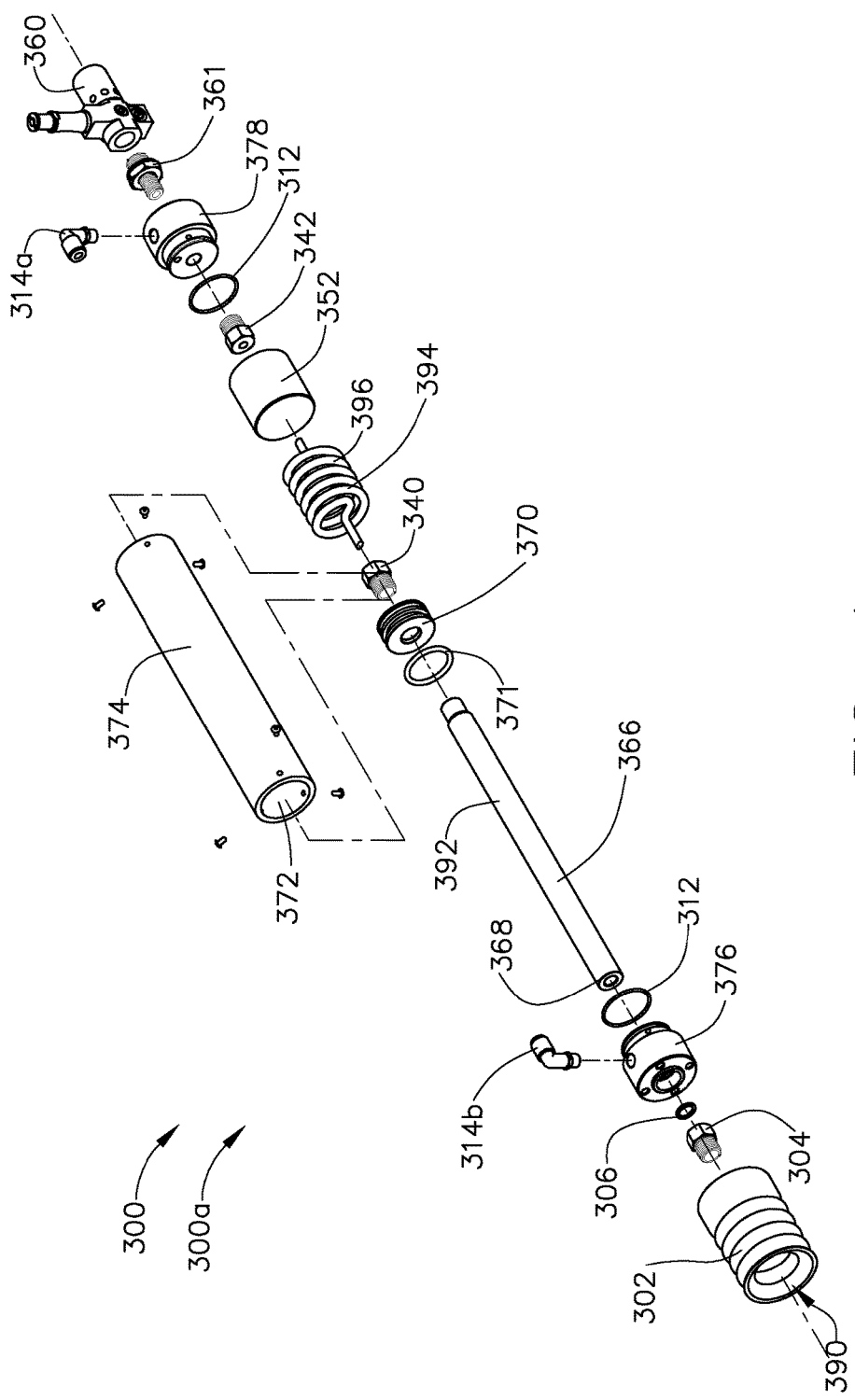
FIG. 4 illustrates an exploded view of a first embodiment of a dual acting cylinder shown in FIG. 3.

FIGS. 4-6 show a first embodiment of the dual acting cylinder 300 of the present innovation, henceforth referred to as dual acting cylinder 300a. Dual acting cylinder 300a is shown exploded in FIG. 4, retracted in FIG. 5, and extended in FIG. 6. Dual acting cylinder 300a can comprise vacuum cup 302 on an extendable and retractable end thereof, vacuum source 360, and a passageway 390 connecting the vacuum cup 302 to the vacuum source 360 through dual acting cylinder 300a. Passageway 390 of dual acting cylinder 300a can have a rigid portion 392 through hollow rod 366, and a flexible portion 396 through coiled hose 394 that changes length as the dual acting cylinder 300a extends and retracts. With the passageway 390 inside of the dual acting cylinder 300, the dual acting cylinders 300 can be placed closer together in manipulator 142 or 242 to maximize the number of vacuum cups 302 to contact articles 50.

Dual acting cylinder 300a comprises hollow cylinder 374 sealed with front end 376 and rear end 378 by seals 312 to define a chamber 372 therebetween. Piston 370 reciprocatably mounts within a chamber 372 of cylinder 374, is attached to hollow rod 366, and includes a piston ring 371. Piston ring 371 divides hollow cylinder chamber 372 into a sealed front chamber 382 and a sealed rear chamber 384. Shaft seal 306 mounts in front end 376 and slidingly engages with hollow rod 366. Protruding end 368 of hollow rod 366 extends from front end 376 and is openly attached to vacuum cup 302 with cup fitting 304. Piston 370 can extend and retract vacuum cup 302 towards and away from the front end 376 in response to fluidic actuation. Flexible portion or coiled hose 394 is located inside rear chamber 384 and connects to hollow rod 366 through piston fitting 340, and to rear end 378 through rear fitting 342. Rear fitting 342 openly communicates with vacuum source 360 through rear end 378 and vacuum fitting 361. Passageway 390 of dual acting cylinder 300a openly communicates through cup fitting 304, hollow rod 366, piston fitting 340, flexible portion 394, rear fitting 342, rear end 378, and vacuum fitting 361 to connect vacuum cup 302 to vacuum source 360 through the dual action cylinder 300a. Vacuum source 360 can be a vacuum generator that generates vacuum from the application of compressed fluid such as air delivered to port 362, but is not limited thereto.

To extend the vacuum cup 302, a pressurized fluid such as air is delivered into rear chamber 384 through a fluid fitting or air fitting 314a while front chamber 382 is vented to the atmosphere. As the rear chamber 384 is pressurized, piston 370 moves towards front end 376 pushing air out of front chamber 382 and extending vacuum cup 302 (see FIG. 6). To retract the extended vacuum cup 302, pressurized air is applied to front chamber 382 through air fitting 314b while venting rear chamber 384 to the atmosphere (see FIG. 5). As will be described later, venting both the front and the rear chambers 382, 384 to the atmosphere holds vacuum cup 302 in position from friction or drag between piston ring 371 and hollow cylinder 374, and from friction and drag between shaft seal 306 and hollow rod 366.

Flexible portion 394 of the passageway 390 can comprise flexible tube 396 that extends and retracts in response to movement of the rod 366 and piston 370. The flexible tube 396 can be coiled to enhance extension and can be constructed from nylon or any other suitable material such as but not limited to polyurethane or metals such as spring steels or nitinol. The placement of the flexible tube 396 within the hollow 372 of the cylinder 374 protects the flexible tube 396 from unwanted damage from collisions, limits bending thereof, and shortens the length of the double action cylinder 365. A stop 352 can be provided in the rear chamber 384 to limit rearward motion of the piston 370 to prevent overstressing of the flexible tube 396. Stop 252 can be sized to receive the flexible portion 394 (flexible tubing 396) of the passageway 390 within. Stop 352 can be attached to the cylinder 374, or alternately can be attached to the rear end 378, or free floating with cylinder 374.

FIGS. 7 and 8 show a second embodiment of the dual acting cylinder 300 of the present innovation, henceforth referred to as dual acting cylinder 300b. First and second embodiments of dual acting cylinders 300a, 300b are configured to interchangeably mount in the manipulators 142 and 242, and can use the same vacuum cups 302, vacuum sources 360, and air fittings 314a, 314b. Dual acting cylinder 300b also includes an open vacuum passageway 490 that can change in length, the passageway 490 extending through the dual acting cylinder 300b between vacuum cup 302 and vacuum source 460.

Dual acting cylinder 300b comprises hollow cylinder 474 sealed with front end 476 and rear end 478 by seals 312 to define chamber 472 therebetween. Piston 470 is reciprocably mounted in hollow cylinder 474 and is sealed therewith by piston ring 471 to divide hollow cylinder chamber 472 into a sealed front chamber 482 and a sealed rear chamber 484. Magnetic ring 436 can attach to piston 470 adjacent to piston ring 47 land can be in contact with hollow cylinder 474. Front shaft 466 is hollow, attaches to piston 470, and slidably mounts in. Hollow shaft 466 extends through piston 470, attaches thereto, and has protruding end 468 extending from front end 476. Shaft seal 406 mounts in front end 476 to seal with reciprocating front shaft 466. Vacuum cup 302 is attached to the protruding end 468 of front shaft 466 with cup fitting 404. A hollow rear shaft 467 extends from rear end 478 and is nested inside of or slidingly received within hollow front shaft 466. Shaft seal 469 is attached to a front of rear shaft 467 and forms a sliding seal 469 with movable front shaft 466. Extending the dual acting cylinder 300b from the retracted position shown in FIG. 7 to the extended position shown in FIG. 8 slides front shaft 466 along rear shaft 467 while maintaining a vacuum seal therewith. As shown, vacuum path 490 and protruding end 468 changes in length as front shaft 466 extends from or retracts into front end 476. Passageway 490 of dual acting cylinder 300b openly extends through hollow front shaft 466, piston 470, hollow rear shaft 467, through rear end 378, vacuum fitting 361, and connects vacuum source 360 to vacuum cup 302 through the dual acting cylinder 300b.

To extend the vacuum cup 302, a pressurized fluid such as air is delivered into rear chamber 484 through air fitting 314a while front chamber 482 is vented to the atmosphere. As the rear chamber 484 is pressurized, piston 470 moves towards front end 476 pushing air out of front chamber 482 and extending vacuum cup 302 (see FIG. 7). As piston 470 moves forward, hollow front shaft 466 internally exposes rear shaft 467 (see FIG. 8) and seal 469 maintains a vacuum seal therebetween. To retract the extended vacuum cup 302, pressurized air is applied to front chamber 482 through air fitting 314b, while venting rear chamber 484 to the atmosphere (see FIG. 8). Venting both the front and the rear chambers 482, 484 to the atmosphere holds vacuum cup 302 in position from friction or drag between piston ring 471 and hollow cylinder 374, from friction and drag between shaft seal 406 and hollow rod 466, and from seal 469 sealing between front shaft 466 and rear shaft 467. If cylinder 474 is magnetic metal such as steel or iron, magnetic ring 436 attached to piston 432 can magnetically hold piston 436 thereto for added holding power of vacuum cup 302. The friction, drag and holding power can be used in a method described below to pick pluralities of articles that present an irregular face to the vacuum cups 302 of the manipulator 142, 242.

FIGS. 9-13 schematically illustrate a method of using a plurality of dual acting cylinders 300 to acquire articles 50 with vacuum cups 302. Dual acting cylinders 300 can be either of dual acting cylinders 300a or 300b. The method described below can be used with either of the first robotic vehicle 100 or the second robotic vehicle 200, can use either dual action cylinders 300a or 300b and dual element numbers can apply to each schematically shown element. Where each of the first robotic vehicle 100 or the second robotic vehicle 200 have elements that perform the same function but are physically different, the element name can have two element numbers associated therewith. One example of this is the robot arm 140, 240 shown in FIGS. 1-2 and FIGS. 9-13. First robotic vehicle 100 has robotic arm 140 and second robotic vehicle 200 has robotic arm 240. Both appear to be physically different, and both move according to the method shown in FIGS. 9-13 and described below. The reader is directed to FIG. 1 to see the first robotic vehicle 100 and elements and element numbers associated therewith, and to FIG. 2 to see second robotic vehicle 200 and elements and element numbers associated therewith. Some parts are common to both first robotic vehicle 100 and the second robotic vehicle 200 such as dual acting cylinders 300, vacuum cups 302, air fittings 314a, and 314b and vacuum sources 360. As described previously, vacuum cups 302 are connected to vacuum generators 360 through the dual acting cylinders.

In FIGS. 9-13, each first or second robotic vehicle 100, 200 is depicted schematically as having a manipulator 142, 242 comprising plurality of dual acting cylinders 300 for acquiring articles 50. Each manipulator 140, 240 is attached to a respective robot arm 140, 240 for movement therewith, and each robot arm 140, 240 is attached to a respective mobile body 120, 220. A controller 124, 224 is attached to respective first or second robotic vehicle 100, 200 and controls movement of the respective mobile body 120, 220 and the respective robot arm 140, 240. A compressed air source 126, 226 is attached to respective robotic vehicle 100, 200 and engages with dual acting cylinders 300. On each first and second robotic vehicle 100, 200, the respective compressed air source 126, 226 is connected by air lines to an extension valve 500 which connects to rear air fitting 314a on a dual acting cylinder 300, to a retraction valve 510 which connects to front air fitting 314b on dual acting cylinder 300, and to suction valve 520 which connects to port 362 of vacuum source 360. Each one of the extension valve 500, retraction valve 510, and suction valve 520 is present on first and second robotic vehicles 100, 200, operates independently, and is operatively connected to respective controller 124, 224.

Each one of the extension valve 500 and retraction valve 510 is a three position valve with an "on" position that sends pressurized air to front chambers 382, 482, or rear chambers 384, 484 of dual action cylinders 300a, 300b to extend or retract the dual acting cylinders 300. Extension valve 500 and retraction valve 510 also have an "off" position that retains pressurized air in a respective front or rear chambers 382, 384 of dual action cylinder 300 to hold the dual acting cylinder in an extended or retracted position. Extension valve 500 and retraction valve 510 also have a "vent" position that connects the front chambers 382, 482, and rear chambers 384, 484 of dual action cylinders 300a, 300b respectively to atmospheric air pressure. Extension valve 500 has an extension vent 500a to vent pressure from rear chamber 384 or 484 and retraction valve 510 has a retraction vent 510a to vent pressure from front chamber 382 or 482 of dual acting cylinders 300a and 300b respectively.

When extension valve 500 is in the vent position, pressurized air in the rear chamber 384, 484 is vented out to the atmosphere through extension vent 500a. When retraction valve 510 is in the vent position, pressurized air in the rear chamber 384, 484 is vented out to the atmosphere through retraction vent 510a.

Suction valve 520 has an "on" position to supply compressed air to generate vacuum at vacuum source 360, and an "off" position to block air delivery to the vacuum source and to cease the generation of vacuum at vacuum source 360. Suction valve 520 can be placed in a "vent" position where the suction vent 520a is opened to atmospheric to break vacuum in the dual acting cylinder 360. For clarity, only one set of valves 500, 510 and 520 are shown in FIGS. 9-12 and one set of connecting air lines to one of the dual acting cylinders 300. Extension cylinders 365 can be dual acting fluidic cylinders that can be actuated with either a compressible or incompressible fluid such as air or hydraulic fluid.

Figure 9:
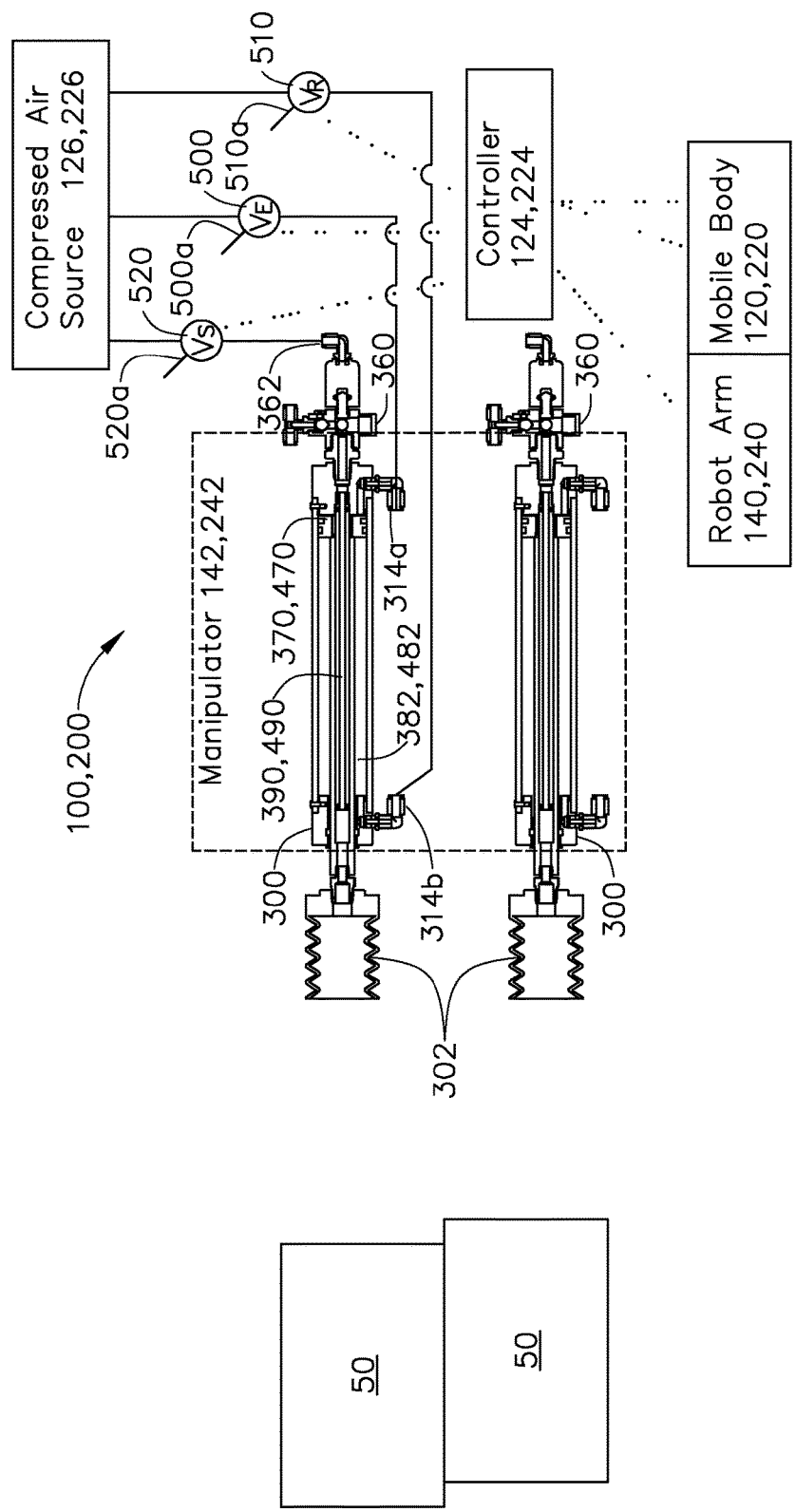
FIG. 9 illustrates a first method step wherein a plurality of dual acting cylinders of the manipulator of FIG. 3 is in a retracted position movable arm of the autonomous robotic vehicle.

FIG. 9 shows a pair of articles 50 in a staggered orientation ready to be acquired by a plurality of dual action cylinders 300 in manipulators 142, 242. The staggered orientation of articles 50 exceeds the deflection capabilities of the vacuum cups 302.

Figure 12:
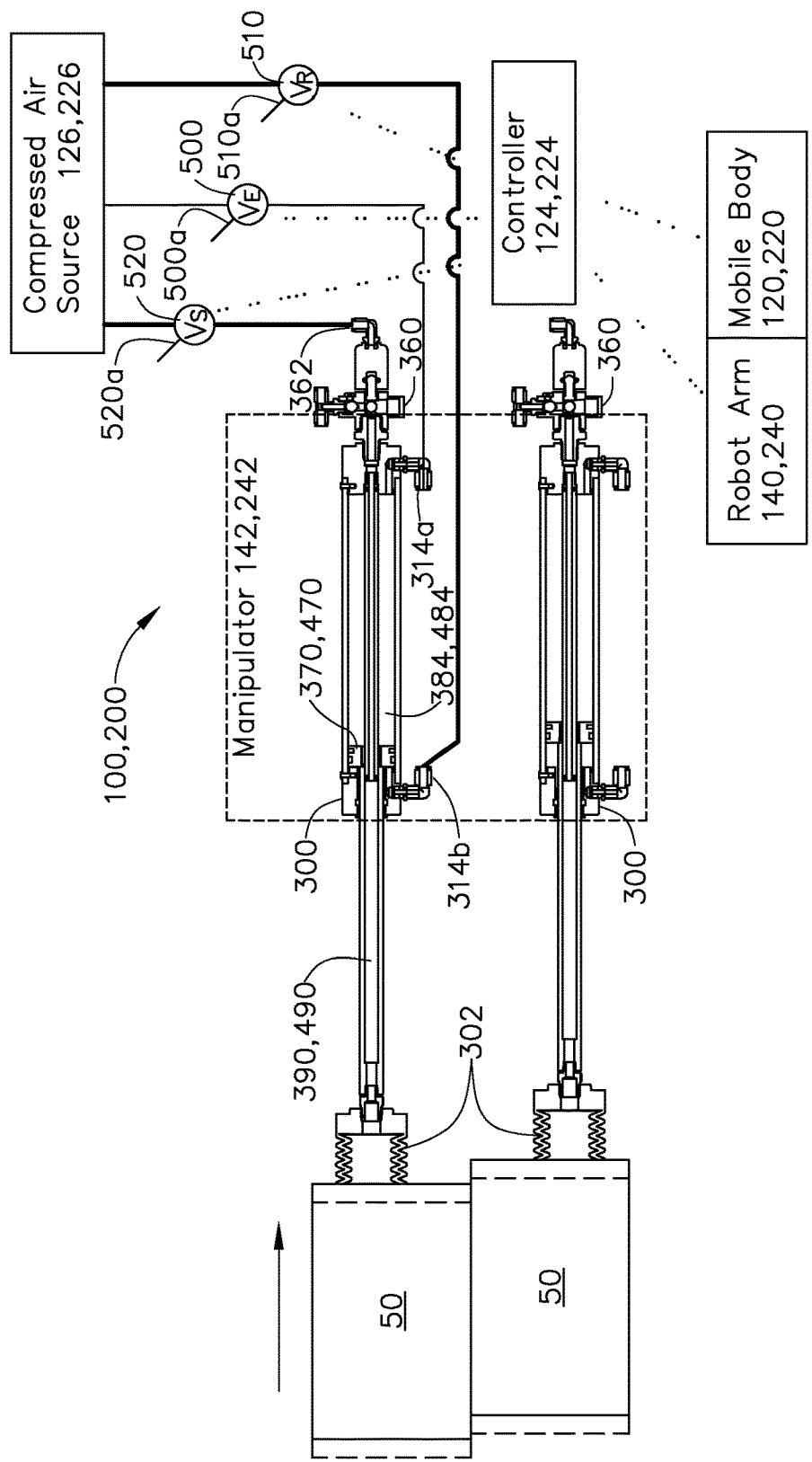
FIG. 12 illustrates a fourth method step wherein air pressure is being applied to a front chamber of the dual acting cylinder and the articles are beginning to move towards the manipulator. is a flow chart showing the method steps in using the dual acting cylinders.
Figure 13:
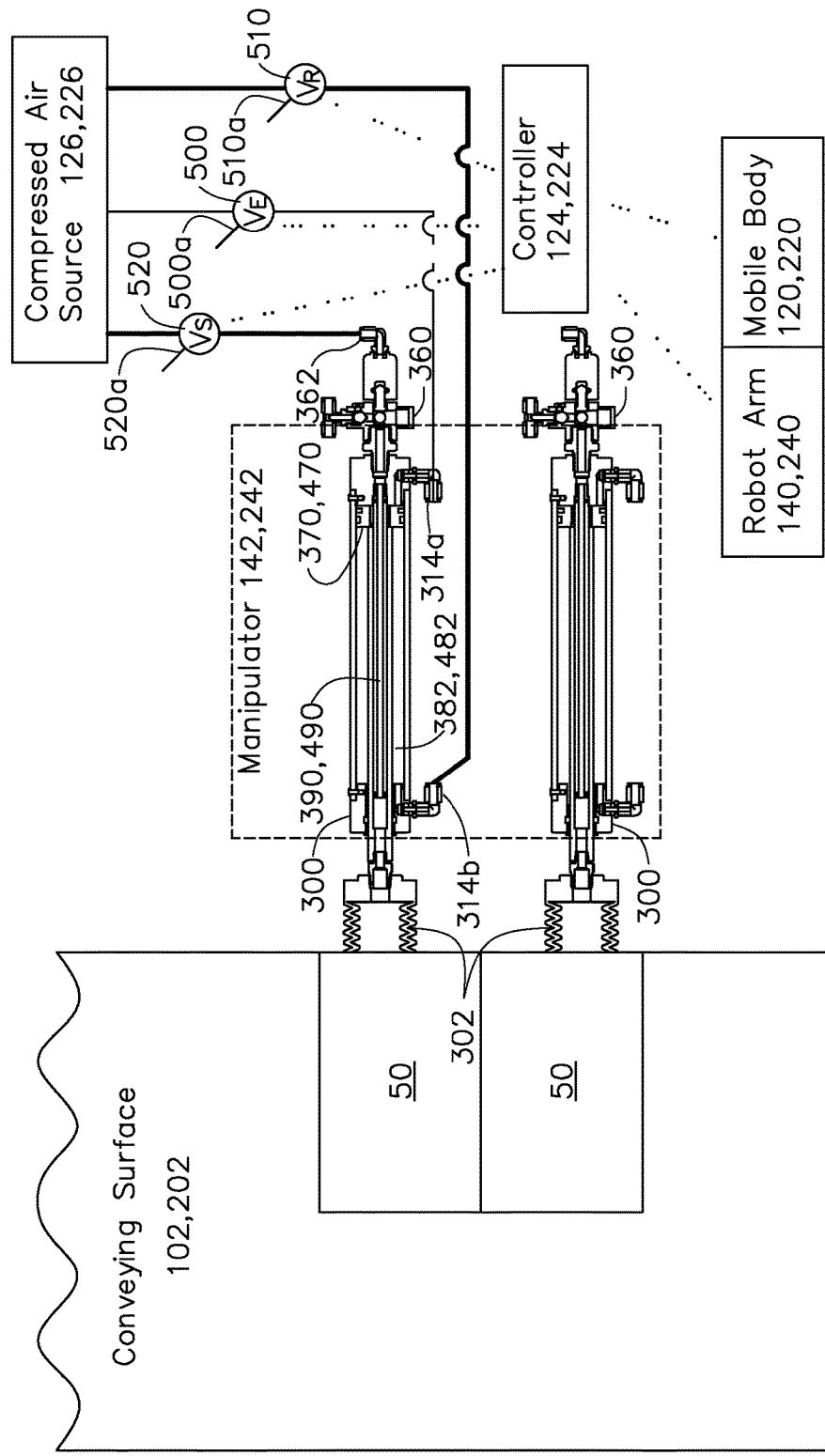
FIG. 13 illustrates a fifth method step wherein the robot arm and manipulator are placing articles onto a conveying surface.
Figure 14:
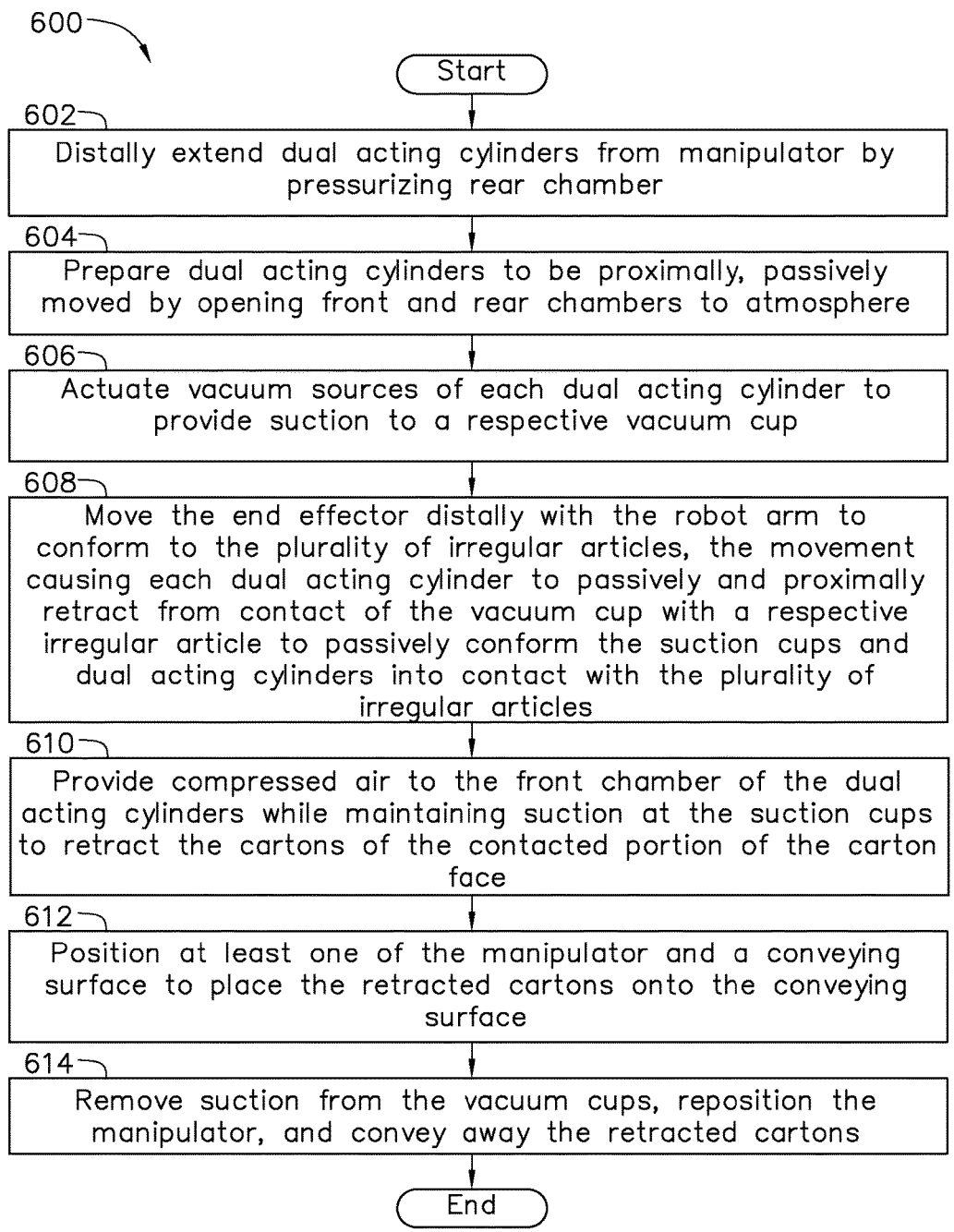
FIG. 14 is a method flow chart showing the method steps of using the dual acting cylinders to acquire articles and to move them to the conveying surface.

FIG. 14 discloses a method of controlling a robot arm 140, 240 with controller 124, 224 (see FIGS. 9-13). The robot arm 140, 240 is configured to passively conform to a plurality of irregular articles 50. The robot arm comprises a manipulator 142, 242 movable with the robot arm 140 with a plurality of dual acting cylinders 300 attached to the manipulator 142, 242. Each of the dual acting cylinders 300 has a front chamber 382, 482 and a rear chamber 384, 484 and each has a vacuum cup 302 movable as the dual acting cylinder 300 extends and retracts. Each of the vacuum cups 302 is connected to a passageway 390 extending through the dual acting cylinder 300 with each passageway 390 changing length as the dual acting cylinder 300 extends and retracts. A vacuum source 360 is switchably connected to the vacuum cups 302 through the passageway 390 and a compressed air source 126, 226 is switchably connected to each of the front chamber 382, 482 and rear chambers 384, 484 to respectively retract and extend the vacuum cups 302. As shown in FIG. 14, the method comprises the following steps.

Figure 10:
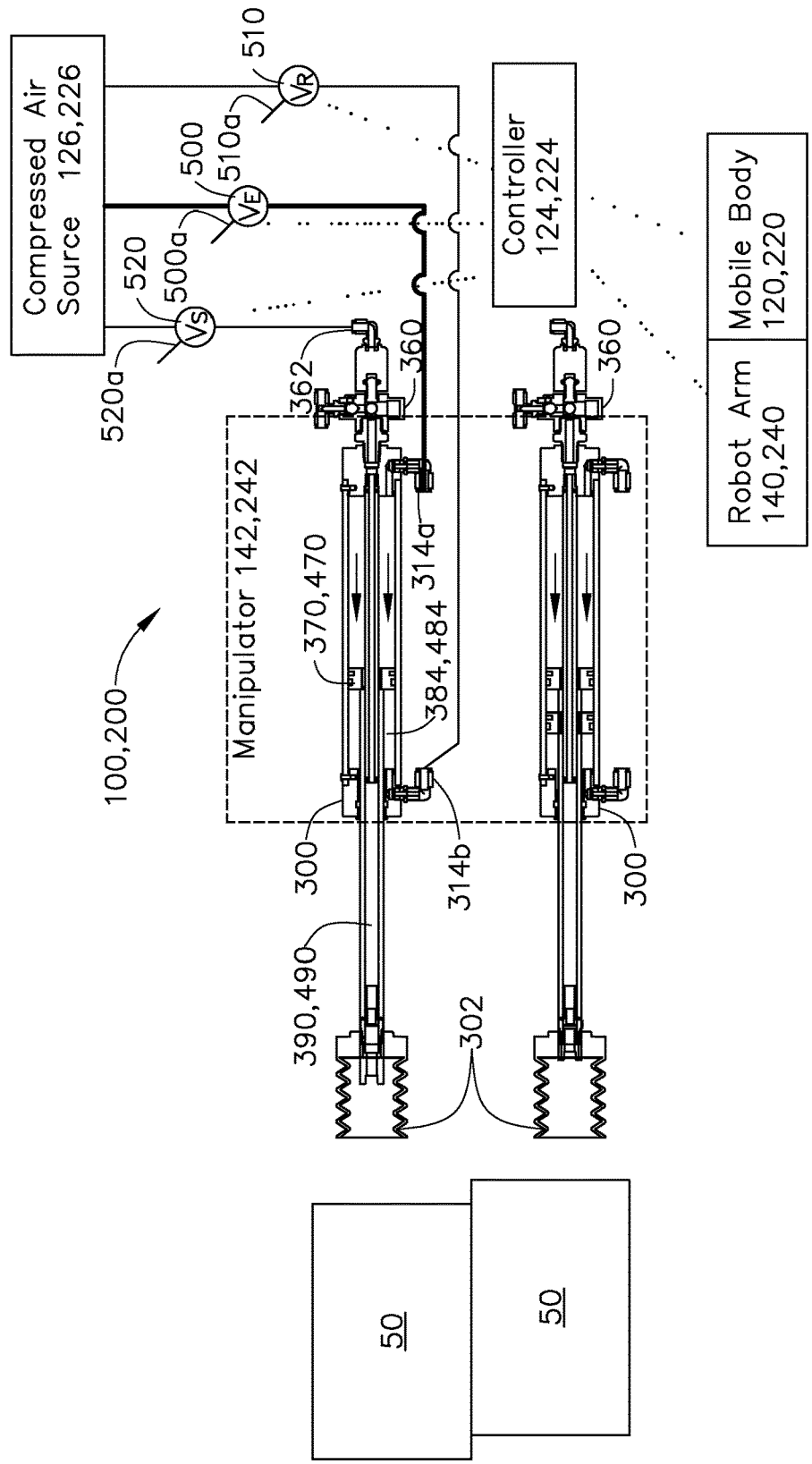
FIG. 10 illustrates a second method step wherein the plurality of dual acting cylinders of FIG. 9 are moved to an extended position by pressurizing a rear chamber of each of the dual acting cylinders.

Block 602 illustrates the step of extending dual acting cylinders 300 from manipulator 242 by pressurizing rear chamber 384, 484. As shown in FIG. 10, extension valve 500 is opened to deliver compressed air from compressed air source 126, 226 to fitting 314a and into rear chamber 384, 484. Air lines delivering compressed air are shown bolded to indicate pressure therein.

Figure 11:
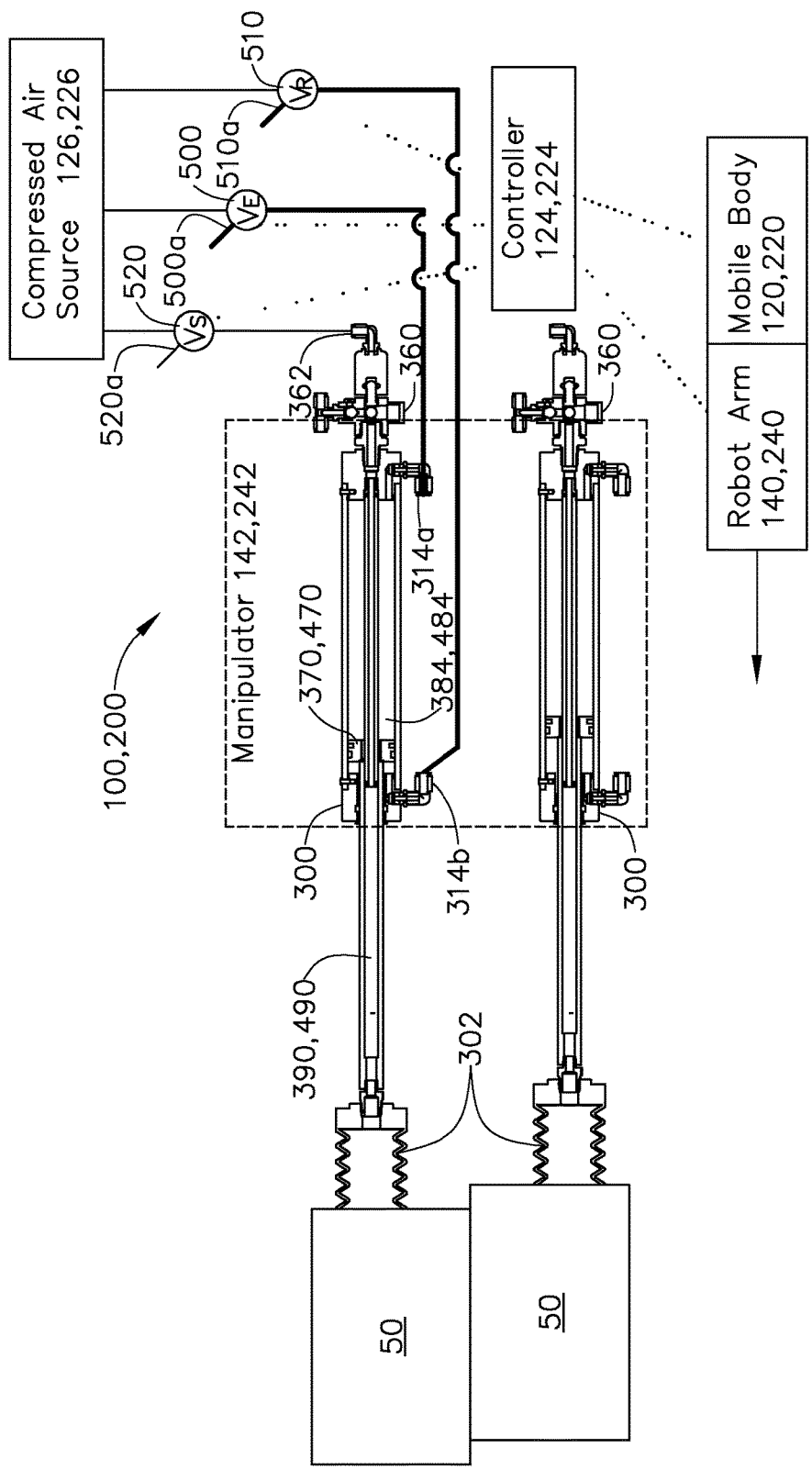
FIG. 11 illustrates a third method step wherein pressure in a front and the rear chamber of each dual acting cylinder is vented to the atmosphere and the robot arm is moving forward to bring vacuum cups into contact with irregular row of articles, wherein the dual acting cylinders are proximal and passively conforming to the irregular row of articles.

Block 604 illustrates the step of preparing dual acting cylinders 300 to be proximally, passively moved by opening front chamber 382, 482 and rear chamber 384, 484 to atmospheric pressure. This step is illustrated in FIG. 11 where each extension valve 500 and retraction valve 510 are opened by controller 124, 224 to vent pressure in front chamber 382, 482 and rear chamber 384, 484 out of extension vent 500a and retraction vent 510a. Air pressure lines involved in this step are bolded.

Block 606 illustrates the step of actuating each vacuum source 360 of each dual acting cylinder 300 to provide suction to a respective vacuum cup 302. This step is illustrated in FIG. 12 where suction valve 520 is opened by controller 124, 224 to provide compressed air to vacuum source 360 and to create suction or vacuum in the passageway 390, 490 and vacuum cups 302. Air lines to vacuum switch 520 and vacuum source 360 are bolded to show the path of compressed air thereto.

Block 608 illustrates the step of moving the manipulator 142, 242 distally with the robot arm 140, 240 to conform to the plurality of irregular articles 50, the movement causing each dual acting cylinder 300 to passively and proximally retract from the contact of the vacuum cup 302 with a respective irregular article 50 to passively conform the vacuum cups 302 and dual acting cylinders 300 to the plurality of irregular articles 50. This step is also illustrated in FIG. 12 where an arrow extends from the robot arm block 140, 240 to show the direction of motion of the robot arm 140, 240 and attached manipulator 142, 242. In this view, controller 124, 224 moves robot arm 140, 240 and holds suction valve 520 open. The cylinders 300 are shown passively and proximally retracted from contact of the vacuum cup 302 with a respective irregular article 50.

Block 610 illustrates the step of providing compressed air to the front chamber 382, 482 of the dual acting cylinders 300 while maintaining suction or vacuum at the vacuum cups 302 to retract the plurality of irregular articles 50 towards the manipulator 242. This step is also controlled by the controller 124,224 and is illustrated in FIG. 12 where an arrow is provided above the articles 50 to indicate the movement of articles 50 from the dashed line position to the solid line position. In this view, suction valve 520 is held open by 124,224.

Block 612 illustrates the step of providing a conveying surface 102, 202 and positioning at least one of the manipulator 142, 242 and a conveying surface 102, 202 to place the plurality of irregular articles 50 onto the conveying surface 102,202. This step is illustrated in FIG. 13. In this FIG., controller 124,224 has moved robot arm 140, 240, manipulator 142, 242, and articles 50 to the conveying surface 102,202 and vacuum is still being provided to the vacuum cups 302. Once vacuum 302 is released, the articles will be deposited onto the conveying surface 102, 202.

Block 614 illustrates the step of removing suction from the vacuum cups to release the plurality of irregular articles onto the conveying surface, repositioning the manipulator, and conveying away the retracted cartons. This step is not shown.

As described above, the present innovation can comprise a dual acting fluidic cylinder 300 comprising a hollow cylinder 374, 474 having a front end 376, 476, and a rear end 378, 478 enclosing a chamber 372, 472 within. A rod 366 and piston 370 are reciprocatingly movable within the chamber 372, 472 and with a tip 368, 478 of the rod 366, 466 protruding through the front end 376, 476 of the dual acting cylinder 300. A passageway 390, 490 extends through the dual acting cylinder 300 from the rear end 378, 478 to the protruding tip 368, 468 of the rod 366, wherein the passageway 390, 490 provides open communication between the tip 368, 468 and the rear end 378, 478, and changes length along the direction of reciprocation as the rod 366, 466 and piston 370, 470 move.

In the above description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. In the above described flow chart, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

All publications, patents and patent applications cited herein, whether supra or infra, are hereby incorporated by reference in their entirety to the same extent as if each individual publication, patent or patent application was specifically and individually indicated as incorporated by reference. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material. It must be noted that, as used in this specification and the appended claims, the singular forms "a", "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

References within the specification to "one embodiment", "an embodiment", "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises", "comprising", and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A method of acquiring articles with a manipulator of a robot arm by passively conforming the manipulator to a plurality of irregular articles comprising:
   providing a plurality of dual acting cylinders attached to the manipulator;
   extending the plurality of dual acting cylinders from the manipulator by pressurizing rear chambers thereof;
   preparing dual acting cylinders to be proximally passively moved by opening front chambers and rear chambers to atmosphere;
   holding the vacuum cup in place passively with friction;
   providing suction to a vacuum cup on an extendable and retractable end of each dual acting cylinder;
   moving the manipulator distally with the robot arm to passively conform to the plurality of irregular articles, the movement causing each dual acting cylinder to passively and proximally retract from contact of the vacuum cups with a respective irregular article and to passively conform the vacuum cups and dual acting cylinders to the plurality of irregular articles.

2. The method of claim 1, further comprising acquiring articles with vacuum when the vacuum cup contacts a respective irregular article.

3. The method of claim 1 further comprising the step of retracting the plurality of articles towards the manipulator by providing compressed air to the front chamber of the dual acting cylinders.

4. The method of claim 1 further comprising the step of providing a conveying surface and positioning at least one of the manipulator and the conveying surface to place the plurality of articles onto the conveying surface.

5. The method of claim 3 further comprising the step of removing suction from the vacuum cups to release the plurality of irregular articles onto the conveying surface.

6. The method of claim 4 further comprising the step of repositioning the manipulator, and conveying away the plurality of articles with the conveying surface.

7. A robot arm for acquiring a plurality of irregular articles from one selected from a truck trailer, a shipping container, and a warehouse by passively conforming the robot arm to the plurality of irregular articles, wherein the robot arm comprises:
   a mobile body with the robotic arm mounted on the mobile body;
   a plurality of retractable and extendable dual acting cylinders attached to a movable end of the robotic arm, each comprising: a front chamber, a rear chamber, and a vacuum cup for acquiring articles; and
   a controller to switchably connect each front chamber and each rear chamber to a selected one of pressurized air and atmospheric air pressure,
      wherein when the controller connects the front chambers to pressurized air, and connects the rear chambers to atmospheric air pressure, the dual acting cylinders are configured to retract the vacuum cups,
      wherein when the controller connects the front chambers to atmospheric air pressure and connects the rear chambers to pressurized air, the dual acting cylinders are configured to extend the vacuum cups, and
      wherein when the controller connects the front chamber and the rear chamber of the extended vacuum cups to atmospheric air pressure, the dual acting cylinders are configured to passively conform to the irregular articles, and when the controller moves the robot arm distally to contact the irregular articles with the vacuum cups, each of the passively configured dual acting cylinders passively and proximally retracts from contact of the vacuum cup with a respective irregular article, and passively conforms the plurality of vacuum cups and dual acting cylinders to the plurality of irregular articles.

8. The robot arm of claim 7 further comprising an extension valve operably connecting the controller to the rear chamber of each of the dual acting cylinders, the extension valve switchably movable with the controller between:
   an on position to connect the rear chamber to pressurized air to extend the respective vacuum cup,
   an off position to retain pressurized air in the rear chamber to hold the respective vacuum cup in an extended position, and
   a vent position to vent pressurized air in the rear chamber to atmospheric air pressure through extension vent.

9. The robot arm of claim 8 further comprising a retraction valve connecting the controller to the front chamber of the dual acting cylinder, the retraction valve switchably movable with the controller between:
   an on position to connect the front chamber to pressurized air to retract the respective vacuum cup,
   an off position to retain pressurized air in the front chamber to hold the respective vacuum cup a retracted position,
   a vent position to vent pressurized air in the front chamber to atmospheric air pressure through a retraction vent.

10. The robot arm of claim 7 further comprising a suction valve connecting the controller to the vacuum cup, the suction valve switchably movable with the controller between:
    an on position to deliver suction to the vacuum cups from a vacuum source,
    an off position for blocking delivery of pressurized air to the vacuum source to cease generation of vacuum with vacuum source, and
    a vent position for connecting atmospheric air pressure to the vacuum cup through the suction vent, the connection breaking the suction in the vacuum cups.

11. The robot arm of claim 10 wherein the at least one vacuum source comprises a vacuum generator and when the suction valve is in the on position, the suction valve connects compressed air to the vacuum generator to create suction in the vacuum cup.

12. The robot arm of claim 10 wherein each of the plurality of dual acting cylinders further comprises a vacuum passageway extending through at least one of the sealed front chamber and sealed rear chamber to communicate vacuum to the respective vacuum cup.

13. The robot arm of claim 12 wherein at least a portion of the vacuum passageway is flexible to extend and retract in response to movement of the vacuum cup.

14. The robot arm of claim 12 wherein the vacuum passageway comprises nested hollow shafts and the vacuum passageway changes length as the vacuum cup extends and retracts.

15. The robot arm of claim 7 wherein the dual acting cylinders include at least one sealing element and when the front chamber and the rear chamber are open to atmospheric air pressure, the vacuum cup is held at least partially in position with friction.

16. The robot arm of claim 7 wherein the dual acting cylinder further comprises a magnet and when the front chamber and the rear chamber are open to atmospheric air pressure, the vacuum cup is held at least partially in position with the magnet.

17. A robot arm for acquiring a plurality of-irregular articles from one selected from a truck trailer, a shipping container, and a warehouse by passively conforming the robot arm to the plurality of irregular articles, wherein the robot arm comprises:
    a manipulator attached to a free end of the robot arm;
    a plurality of dual acting cylinders attached to the manipulator; and
    a vacuum cup for acquiring articles attached to an extendable and retractable end of each dual acting cylinder;
    wherein the dual acting cylinders have a front chamber and a rear chamber and when the dual acting cylinders are configured to be proximally passively moved, the front chambers and the rear chambers are open to atmospheric air pressure and
    wherein when the dual acting cylinders are configured to be proximally passively moved and the robot arm moves at least some of the plurality of vacuum cups into acquiring contact with the plurality of irregular articles, each dual acting cylinder connected to a contacting vacuum cup retracts from the contact to passively conform to the plurality of irregular articles.

18. The robot arm of claim 17 wherein the robotic arm is mounted on a robotic vehicle.

19. The robot arm of claim 17 wherein when the dual acting cylinders are configured to be proximally passively moved, the suction cups are passively held in place at least partially by friction.

20. The robot arm of claim 17 wherein when the dual acting cylinders are configured to be proximally passively moved, the suction cups are passively held in place at least partially by magnetism.

21. A method of acquiring articles with a manipulator of a robot arm by passively conforming the manipulator to a plurality of irregular articles comprising:
    providing a plurality of dual acting cylinders attached to the manipulator;
    extending the plurality of dual acting cylinders from the manipulator by pressurizing rear chambers thereof;
    preparing dual acting cylinders to be proximally passively moved by opening front
    passively holding the vacuum cups in place with a magnet;
    providing suction to a vacuum cup on an extendable and retractable end of each dual acting cylinder;
    moving the manipulator distally with the robot arm to passively conform to the plurality of irregular articles, the movement causing each dual acting cylinder to passively and proximally retract from contact of the vacuum cups with a respective irregular article and to passively conform the vacuum cups and dual acting cylinders to the plurality of irregular articles.

22. The method of claim 21, further comprising acquiring articles with vacuum when the vacuum cup contacts a respective irregular article.

23. The method of claim 21 further comprising the step of retracting the plurality of articles towards the manipulator by providing compressed air to the front chamber of the dual acting cylinders.

24. The method of claim 21 further comprising the step of providing a conveying surface and positioning at least one of the manipulator and the conveying surface to place the plurality of articles onto the conveying surface.

25. The method of claim 23 further comprising the step of removing suction from the vacuum cups to release the plurality of irregular articles onto the conveying surface.

26. The method of claim 24 further comprising the step of repositioning the manipulator, and conveying away the plurality of articles with the conveying surface.

27. A method of acquiring articles with a manipulator of a robot arm by passively conforming the manipulator to a plurality of irregular articles comprising:
attaching the robot arm to an autonomous vehicle
providing a plurality of dual acting cylinders attached to the manipulator;
extending the plurality of dual acting cylinders from the manipulator by pressurizing rear chambers thereof;
preparing dual acting cylinders to be proximally passively moved by opening front chambers and rear chambers to atmosphere;
providing suction to a vacuum cup on n extendable and retractable end of each dual acting cylinder;
moving the manipulator distally with the robot arm to passively conform to the plurality of irregular articles, the movement causing each dual acting cylinder to passively and proximally retract from contact of the vacuum cups with a respective irregular article and to passively conform the vacuum cups and dual acting cylinders to the plurality of irregular articles.

28. The method of claim 27, further comprising acquiring articles with vacuum when the vacuum cup contacts a respective irregular article.

29. The method of claim 27 further comprising the step of retracting the plurality of articles towards the manipulator by providing compressed air to the front chamber of the dual acting cylinders.

30. The method of claim 27 further comprising the step of providing a conveying surface and positioning at least one of the manipulator and the conveying surface to place the plurality of articles onto the conveying surface.

31. The method of claim 29 further comprising the step of removing suction from the vacuum cups to release the plurality of irregular articles onto the conveying surface.

32. The method of claim 30 further comprising the step of repositioning the manipulator, and conveying away the plurality of articles with the conveying surface.

33. A method of acquiring articles with a manipulator of a robot arm by passively conforming the manipulator to a plurality of irregular articles comprising:
providing a plurality of dual acting cylinders attached to the manipulator;
extending the plurality of dual acting cylinders from the manipulator by pressurizing rear chambers thereof;
preparing dual acting cylinders to be proximally passively moved by opening front chambers and rear chambers to atmosphere;
providing suction to a vacuum cup on an extendable and retractable end of each dual acting cylinder;
moving the manipulator distally with the robot arm to passively conform to the plurality of irregular articles, the movement causing each dual acting cylinder to passively and proximally retract from contact of the vacuum cups with a respective irregular article and to passively conform the vacuum cups and dual acting cylinders to the plurality of irregular articles
coordinating autonomous movement of the robotic arm with a controller during the unloading and loading of articles.

34. The method of claim 33, further comprising acquiring articles with vacuum when the vacuum cup contacts a respective irregular article.

35. The method of claim 33 further comprising the step of retracting the plurality of articles towards the manipulator by providing compressed air to the front chamber of the dual acting cylinders.

36. The method of claim 33 further comprising the step of providing a conveying surface and positioning at least one of the manipulator and the conveying surface to place the plurality of articles onto the conveying surface.

37. The method of claim 35 further comprising the step of removing suction from the vacuum cups to release the plurality of irregular articles onto the conveying surface.

38. The method of claim 36 further comprising the step of repositioning the manipulator, and conveying away the plurality of articles with the conveying surface.

* * * * *